United States Patent Office 3,823,178
Patented July 9, 1974

3,823,178
NOVEL m-(3,3 - DISUBSTITUTEDUREIDO)PHENYL (α-CYANOALKYL)CARBAMATES AND METHOD FOR THE CONTROL OF UNDESIRABLE PLANT SPECIES THEREWITH
Karoly Szabo, Stiegengasse 4/16, A–1060, Vienna, Austria, and Venkat Rao Ganti, 21 Caton Drive, Dewitt, N.Y. 13214
No Drawing. Filed May 8, 1972, Ser. No. 251,489
Int. Cl. C07c *121/52*
U.S. Cl. 260—465 D        7 Claims

ABSTRACT OF THE DISCLOSURE

The present invention relates to novel m-(3,3-disubstitutedureido)phenyl (α-cyanoalkyl)carbamates and to a method for the control of undesirable plant species therewith.

The invention further relates to a method for the preparation of the above-said compounds.

---

This invention relates to novel compounds having the formula:

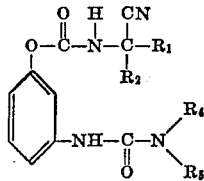

where $R_1$ is methyl or ethyl, or when taken together with $R_2$ forms a rycloalkyl $C_3$–$C_6$; $R_2$ is alkyl $C_1$–$C_8$, cycloalkyl $C_3$–$C_6$ or

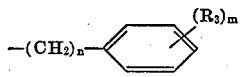

where $R_3$ is hydrogen, halogen, or loweralkyl $C_1$–$C_4$; $n$ is an integer selected from 0, 1, and 2 and $m$ is an integer selected from 0, 1, 2, and 3; $R_4$ is an alkyl radical $C_1$–$C_5$; and $R_5$ represents a member selected from the group consisting of alkyl $C_1$–$C_5$ and alkoxy $C_1$–$C_5$.

The invention also relates to a novel method for controlling undesirable plant species with the above-identified compounds and to a novel method for the preparation of said compounds.

In accordance with the invention, the ureido phenyl carbamates having the above structure can be prepared from α-cyano esters of isocyanic acid or α-cyanoalkylcarbamoyl halides having the structure:

where $R_1$ and $R_2$ are as described above, and R is —NCO or —NHCOCl. These compounds and the preparation therefor are described in our copending application, Ser. No. 251,480 filed simultaneously with the present application. The active compounds are readily prepared by reacting said α-cyanoalkylcarbamoyl halide, or isocyanic acid ester with a ureido phenol in aprotic solvents (for example, ketones, aromatic hydrocarbons, and ethers), such as acetone, ethyl acetate, benzene, toluene, diethyl ether, tetrahydrofuran, or the like. The reaction is carried out in the presence of a weak base catalyst, such as sodium carbonate, potassium carbonate, or an organic tertiary amine, such as triethylamine. The reaction is usually exothermic and does not require heating. Graphically, it may be illustrated as follows:

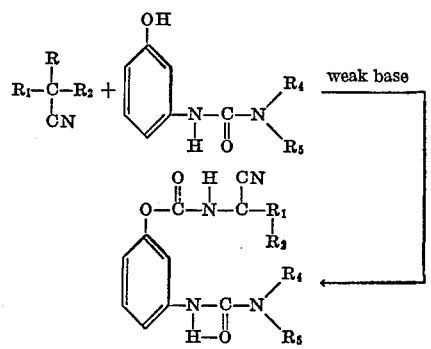

where R, $R_1$, $R_2$, $R_4$, and $R_5$ are as described above.

In practice, we have found that the herbicidally active ureido phenyl carbamates can also be readily prepared by first reacting the appropriate ketone with an alkali metal cyanide, such as sodium or potassium cyanide, and an ammonium salt, preferably the halide or sulfate, in the presence of ammonium hydroxide. The reaction is generally conducted in aqueous solution or in an aqueous-alcoholic mixture, the alcohol preferably being a loweralkanol of from 1 to 4 carbon atoms. Although the reaction may be carried out at room temperature, it is frequently found desirable to heat the reaction mixture to about 40° C. to 100° C., but preferably 40° C. to 55° C. This reaction yields the aminonitrile corresponding to the ketone employed. The reaction is graphically illustrated below using KCN as the alkali metal cyanide and ammonium hydroxide as the base.

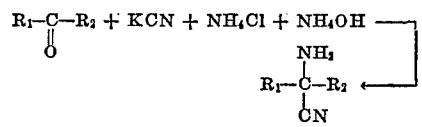

where $R_1$ and $R_2$ are as described above.

Where desired, the aminonitrile is converted to its hydrohalide salt, preferably its hydrochloride salt, by dissolving the free base in anhydrous ether; for example, diethyl ether, tetrahydrofuran, or ethyl ether, and then admixing with said solution the desired hydrohalide. Generally, it is most convenient to mix the acid with anhydrous ether and add this mixture to the ether solution of aminonitrile. The hydrohalide salt precipitates and can be filtered off.

The aminonitrile or the hydrohalide salt thereof is then dissolved or dispersed in an aprotic solvent, such as acetone, ethyl acetate, benzene, toluene, diethyl ether, tetrahydrofuran, or the like. This solution is then cooled to about 0° C. to 10° C. and treated with phosgene gas or a solution of phosgene in aprotic solvent, or both.

The reaction is conducted at a low temperature, preferably about 0° C. to 10° C., although lower temperatures may be used. When admixture of the phosgene with the aminonitrile has ben completed, the carbamoyl chloride corresponding to the aminonitrile is present in solution and can be recovered therefrom if desired or converted to the isocyanate by heating the reaction mixture to refluxing temperature. Generally, about 1 to 2 moles of phosgene per mole of aminonitrile is satisfactory for the reaction, which is graphically illustrated as follows:

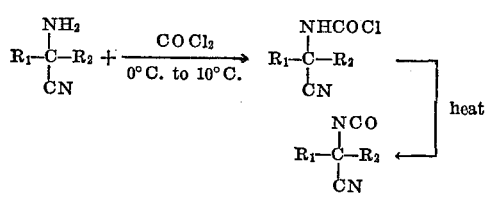

where $R_1$ and $R_2$ are as described above.

In the preferred process, however, the ureido phenol having the formula:

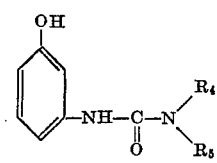

where $R_4$ and $R_5$ are as described above, is dissolved or dispersed in an anhydrous aprotic solvent, such as acetone, methylbutyl ketone, ethyl acetate, benzene, toluene, diethyl ether, tetrahydrofuran, or the like, and the mixture added to the cold solution of carbamoyl chloride. The thus-formed reaction mixture is then treated with weak base, preferably sodium or potassium carbonate. As this latter reaction is generally exothermic, heating of the reaction mixture is not usually required. The ureido phenyl carbamate formed in this reaction can then be recovered from the reaction mixture by any convenient means, such as by filtration, centrifugation, or the like.

The m-(3,3-disubstituted ureido)phenyl (α-cyanoalkyl)-carbamates of the present invention are highly effective herbicides. They may be used as preemergence herbicides by applying a herbicidally effective amount thereof to soil containing seeds of undesirable plants. They are also effective postemergence herbicides when applied in herbicidally effective amounts to the foliage and plant parts of plants sought to be controlled.

The compounds may be formulated as dusts, generally containing from about 1% to 15% by weight of the active compound and from about 99% to about 85% by weight of a diluent, such as attaclay, bentonite, talc, kaolin, diatomaceous earth, or the like.

They may also be prepared as wettable powders by grinding about 25% to 75% by weight of the active material with about 23% to about 73% by weight of a diluent, such as mentioned above, and admixing therewith about 1% to about 5% by weight of an anionic-nonionic emulsifier or surfactant and about 1% to 5% by weight of a dispersing agent, such as an alkali metal lignosulfonate. The wettable powder is generally dispersed in water and applied as a liquid spray in sufficient amount to provide from about 0.5 to 20 pounds per acre of active material, and preferably 0.5 to 8 pounds per acre of said material.

The active compounds can also be made up as discrete granular particles on carriers, such as sand, ground corn cobs, diatomaceous earth, attaclay, or the like. Such formulations are particularly useful as preemergence herbicide formulations when applied in amounts sufficient to provide from about 0.5 to 20 pounds per acre, and preferably 0.5 to 8 pounds per acre of active material.

The following examples are given primarily by way of illustration. No specific details or enumeration contained therein should be construed as limitations on the present invention except insofar as they appear in the appended claims. All parts and percentages are by weight unless otherwise specifically designated.

EXAMPLE 1

2-Amino-2,3,3-trimethylbutyronitrile

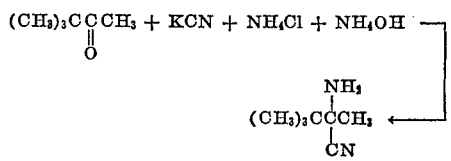

To a two-liter flask is added 66 grams of KCN dissolved in 120 ml. of water, along with a magnetic stirring rod. When almost all of the cyanide is dissolved, 140 ml. of water containing 61 grams of NH₄Cl is introduced into the flask followed by the addition thereto of 67 ml. of concentrated ammonium hydroxide. A solution of the ketone, i.e., 100 grams of pinacolone in 150 ml. of methanol, is added to the mixture and stirred. The mixture was heated to 45° C. to 55° C. for 18 hours and the solvent evaporated to yield the product, a dark heavy oil.

The hydrochloride salt is then obtained by dissolving the oil in anhydrous diethyl ether and admixing therewith hydrochloric acid, preferably in anhydrous diethyl ether. The mixture is filtered and the solvent removed by evaporation under reduced pressure leaving the hydrochloride salt of the aminonitrile.

EXAMPLE 2

2-Amino-2-methylbutyronitrile

Methyl ethyl ketone (72 grams) is mixed with 73 grams of ammonium sulfate. To this suspension is then added 200 ml. of solvent ether. The mixture is then stirred at 20° C. to 25° C. (slight cooling). A solution of sodium cyanide (50 grams in 200 ml. of water) is then added dropwise during one hour and the reaction mixture stirred for 7 to 10 hours. The inorganic salts are filtered off and the aqueous layer extracted three times with 200 ml. portions of ether. All ether extracts are combined, dried over anhydrous potassium carbonate, and then concentrated by evaporation under vacuum.

The residue is distilled at 15 mm. to give 45 to 50 grams of product with boiling point 68° C.

EXAMPLE 3

Following the procedure of Example 1, but substituting the appropriate ketone for pinacolone, yields the corresponding aminonitriles reported in Table I below. The hydrochloride salts of each are likewise prepared as described in Example 1.

ketone                           aminonitrile

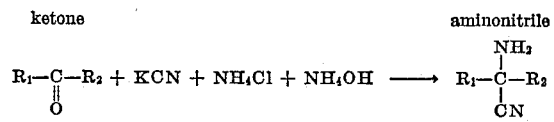

TABLE I
Ketone/Aminonitrile

| R₁ | R₂ |
|---|---|
| Methyl | Methyl |
| Methyl | Isopropyl |
| Methyl | Phenyl |
| Ethyl | Butyl |
| Cyclohexyl | |
| Cyclopentyl | |
| Methyl | t-Butyl |
| Methyl | n-Propyl |
| Methyl | Sec.-butyl |
| Methyl | Benzyl |
| Methyl | Phenethyl |
| Ethyl | Benzyl |
| Methyl | Cyclopropyl |
| Methyl | 2-ethylbutyl |
| Ethyl | Cyclobutyl |
| Methyl | p-Chlorophenyl |
| Methyl | 2,3-dichlorophenyl |
| Methyl | p-Chlorophenethyl |
| Ethyl | 2-ethylhexyl |
| Methyl | 3-methylbutyl |

EXAMPLE 4
1-Cyano-1,2-dimethylpropyl isocyanate

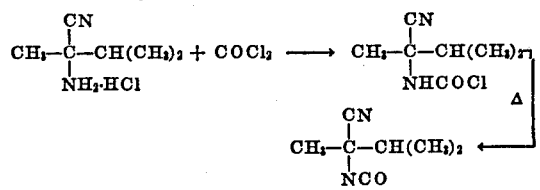

Forty-one grams of 2-amino-2,3-dimethylbutyronitrile hydrochloride is dispersed in 220 ml. of ethyl acetate. The suspension is stirred and phosgene gas bubbled through said suspension. The suspension is gently heated (40° C. to 45° C.) for three hours, then the phosgene and ethyl acetate are removed by heating on a water bath at 90° C. The residue is taken up in dry hexane, filtered and the hexane evaporated to yield 15 grams of product, refractive index $n_D^{25}$ 1.4260.

EXAMPLE 5
1-Cyano-1,2,2-trimethylpropyl isocyanate

Following the procedure of Example 4 and substituting 2-amino-2,3-dimethylbutyronitrile for 2 - amino-2,3-dimethylbutyronitrile yields 1-cyano-1,2,2-trimethylpropyl isocyanate. Boiling point 77° C. to 80° C. at 1 to 2 mm.

EXAMPLE 6
1-Cyano-1,3-dimethylbutyl isocyanate

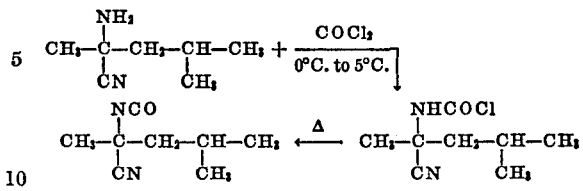

25.2 Grams of 2-amino-2,4-dimethylpentanonitrile is dissolved in 100 ml. of anhydrous ether; 50 ml. of ether saturated with HCl is then added. The precipitated HCl salt is filtered off and dried in a desiccator. The total HCl salt is then used for the conversion to isocyanate using anhydrous reagent grade ethyl acetate as solvent.

The HCl salt is dispersed in 100 ml. of the ethyl acetate and slowly added to a stirred, cold (0° C. to 5° C.) solution of phosgene (80 grams) in 150 ml. of ethyl acetate. Stirring is continued for one hour, then cooling discontinued and the reaction mixture refluxed.

The mixture is cooled and the solvent evaporated under reduced presure. The residue is extracted with hot hexane and the product recovered by distillation. The product has a boiling point of 47° C. to 54° C./0.75 mm.; $n_D^{26}$ 1.4460.

EXAMPLE 7
1-Cyano-1-methylpropyl isocyanate

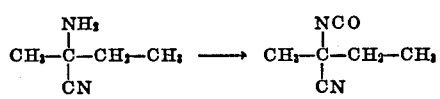

2-Amino - 2 - methylbutyronitrile (39.2 grams) is dissolved in 100 ml. of dry ethyl acetate and added dropwise to a solution of 80 grams of phosgene in 150 ml. of ethyl acetate with vigorous stirring during one hour. The temperature should not be allowed to go over 5° C.

After all the aminonitrile is added, the cooling is discontinued, phosgene gas passed in, and the mixture heated to reflux. Almost all the solid goes into solution, resulting in a golden yellow color. The time of passage of phosgene is 2 to 2½ hours.

Most of the ethyl acetate is removed by distillation by heating on a water bath, leaving a thick viscous residue, which on distillation yields the product, boiling point 54° C. to 56° C. at 12 to 14 mm.; $n_D^{26}$ 1.4165.

This procedure is followed with appropriate aminonitrile substitution to yield the esters of isocyanic acid and isocyanates, reported in Table II.

TABLE II

| Aminonitrile | COCl₂, 0° C. to 5° C., ethyl acetate | α-Cyanoalkylcarbamoyl halide | Reflux | Isocyanate | Isocyanate characterization |
|---|---|---|---|---|---|
|  phenyl-C(CN)(CH₃)-NH₂·HCR | COCl₂, 0° C. to 5° C., ethyl acetate. | 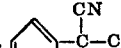 phenyl-C(CN)(CH₃)-NHCOCl | Reflux | 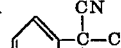 phenyl-C(CN)(CH₃)-NCO | B.P. 86–88° C. at 1.25 mm. |
| CH₃ \| CH₃—C—NH₂ \| CN | ...do.... | CH₃ \| CH₃—C—NH—COCl \| CN | ...do... | CH₃ \| CH₃—C—NCO \| CN | B.P. 144–145° C. |
| cyclohexyl-C(CN)-NH₂·HCl | ...do.... | cyclohexyl-C(CN)-NHCOCl | ...do... | cyclohexyl-C(CN)-NCO | .P. 62° C. at 0.7–1 mm. |
| cyclopentyl-C(CN)-NH₂·HCl | ...do.... | cyclopentyl-C(CN)-NHCOCl | ...do... | cyclopentyl-C(CN)-NCO | B.P. 52–54° C. at 0.5–0.7 mm. |
| N \| CH₃—CH₂—C—CH₂—CH₂—CH₂CH₃ \| NH₂·HCl | ...do.... | CN \| CH₃CH₂—C—(CH₂)₃—CH₃ \| NHCOCl | ...do... | CN \| CH₃—CH₂—(CH₂)₃CH₃ \| NCO | B.P. 69–80° C. at 1–2 mm. |

EXAMPLE 8 m-(3,3-Dimethylureido)phenyl (1-Cyano-1-methylpropyl)carbamate

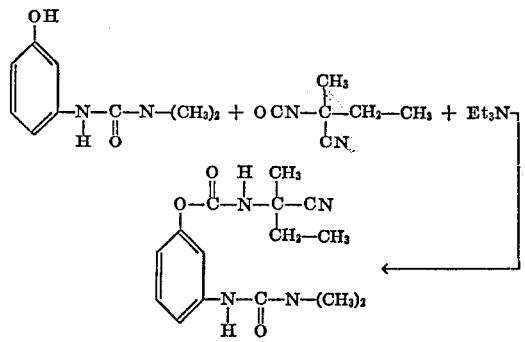

To a suspension of 1,1-dimethyl 3-(m-hydroxyphenyl)-urea (620 mg.) in 5 ml. of dry reagent grade acetone, a drop of triethylamine is added, followed by 420 mg. of 1-cyano-1-methylpropylisocyanate all at once. The reaction is very exothermic and a clear solution results. After standing for 15 minutes, a crystalline mass comes out of solution. The product (1.0 gram) is filtered off and washed with ice-cold acetone to give a melting point of 145° C. to 147° C.

EXAMPLE 9 m-(3-Methoxy-3-methylureido)phenyl (1-cyano-1-methylpropyl)-carbamate

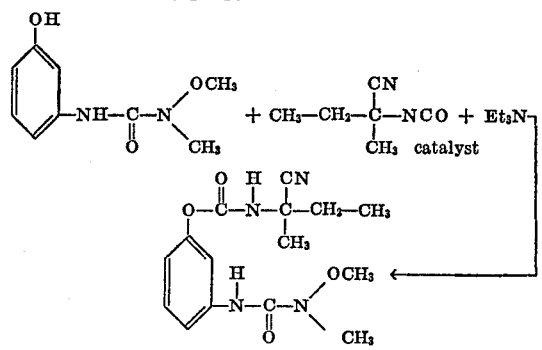

1.96 Grams of 3-(m-hydroxyphenyl) - 1 - methoxy-1-methylurea is dissolved in 20 ml. of acetone, a few drops of triethylamine are added, followed by 1.25 grams of the 1-cyano-1-methylpropylisocyanate. The reaction is exothermic. The reaction mixture is refluxed for one hour and then cooled. The mixture on cooling deposits a crystalline product, which is filtered off, and washed with ice-cold acetone to give 2.4 grams with melting point 147° C. to 149° C.

The mother liquors on dilution with an equal volume of hexane, yield more of the product melting at the same temperature.

EXAMPLE 10 m-(3-Methoxy-3-methylureido)phenyl (1-cyano-1-methylethyl)carbamate

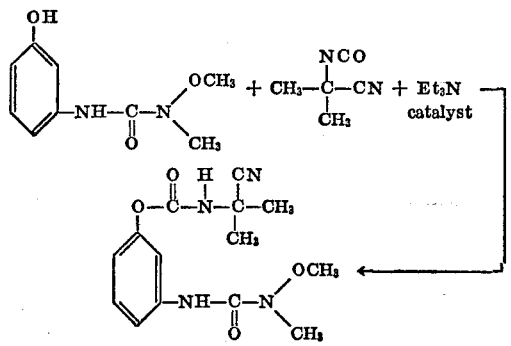

To 10 ml. of anhydrous acetone is added, first, 1.95 grams of the 3-(m-hydroxyphenyl)-1-methoxy-1-methylurea and then 1.3 grams of 1-cyano-1-methylethylisocyanate. Three drops of triethylamine is then added to the mixture and a mildly exothermic reaction occurs. A white solid product precipitates which is collected and dried. The yield is 2.5 grams of product, melting point 165° C. to 167° C.

EXAMPLE 11 m-(3-Methoxy-3-methylureido)phenyl (1-cyano-1-methylethyl)carbamate

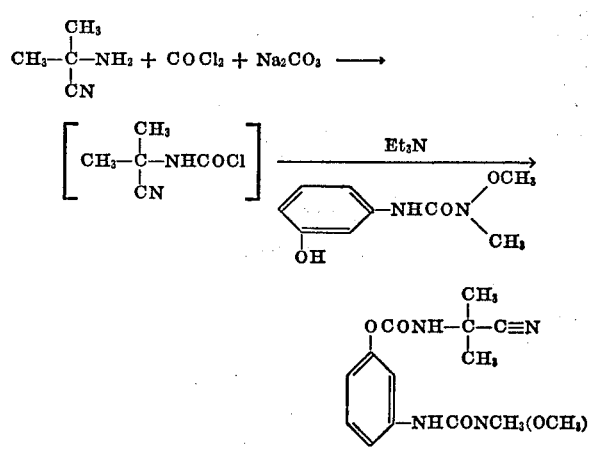

To a phosgene solution (12 grams, 0.12 mole) in dry ethyl acetate (180 ml.) cooled to 0° C. is added anhydrous sodium carbonate (1.5 grams, 0.14 mole) then dropwise with cooling 2-methyl - 2 - aminopropionitrile (8.4 grams, 0.1 mole) in ethyl acetate (40 ml.). A white solid is formed during the addition. After one hour the reaction mixture is allowed to attain reaction temperature (20° C.). Then it is gradually warmed to 60° C. taking 30 minutes. Further phosgene is passed through the mixture for a further 30 minutes at 60° C. to 67° C. and the reaction mixture becomes clear, is filtered and evaporated under reduced pressure to a colorless oil. The infrared spectrum shows very intense absorption at 1740 to 1780 cm.$^{-1}$ assignable as the carbamoyl chloride $$\begin{pmatrix} \text{C—Cl group} \\ \| \\ \text{O} \end{pmatrix}$$

The crude carbamoyl chloride is added to 3-(m-hydroxyphenyl)-1-methoxy-1-methyl urea (17.64 grams, 0.09 mole), triethylamine (11 grams, 0.11 mole) in ethyl acetate (50 ml.) at 25° C. A solid precipitates, further triethylamine (20 grams, 2 moles) is added and the reaction mixture temperature rises to 33° C. The reaction is cooled to 18° C. for 30 minutes and filtered. The solid is stirred with water and dried to give 20.1 grams (80%), melting point 167° C. to 168° C. The filtrate is evaporated almost to dryness, then water-acetone added and a further 2.3 grams (9%), melting point 157° C. to 160° C., is obtained. Total yield 22.4 grams (89%).

TABLE III

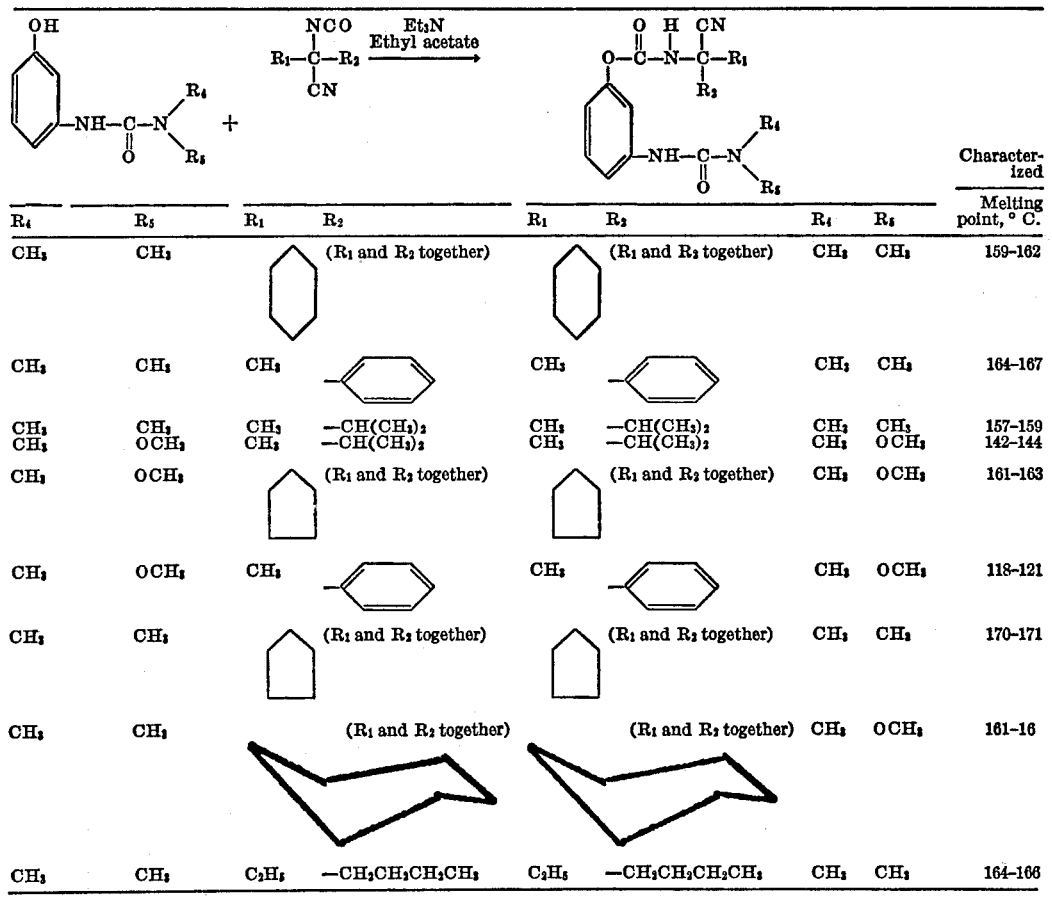

| $R_4$ | $R_5$ | $R_1$ | $R_2$ | $R_1$ | $R_2$ | $R_4$ | $R_5$ | Characterized Melting point, °C. |
|---|---|---|---|---|---|---|---|---|
| $CH_3$ | $CH_3$ | ($R_1$ and $R_2$ together) hexagon | | ($R_1$ and $R_2$ together) hexagon | | $CH_3$ | $CH_3$ | 159-162 |
| $CH_3$ | $CH_3$ | $CH_3$ | phenyl | $CH_3$ | phenyl | $CH_3$ | $CH_3$ | 164-167 |
| $CH_3$ | $CH_3$ | $CH_3$ | $-CH(CH_3)_2$ | $CH_3$ | $-CH(CH_3)_2$ | $CH_3$ | $CH_3$ | 157-159 |
| $CH_3$ | $OCH_3$ | $CH_3$ | $-CH(CH_3)_2$ | $CH_3$ | $-CH(CH_3)_2$ | $CH_3$ | $OCH_3$ | 142-144 |
| $CH_3$ | $OCH_3$ | ($R_1$ and $R_2$ together) pentagon | | ($R_1$ and $R_2$ together) pentagon | | $CH_3$ | $OCH_3$ | 161-163 |
| $CH_3$ | $OCH_3$ | $CH_3$ | phenyl | $CH_3$ | phenyl | $CH_3$ | $OCH_3$ | 118-121 |
| $CH_3$ | $CH_3$ | ($R_1$ and $R_2$ together) pentagon | | ($R_1$ and $R_2$ together) pentagon | | $CH_3$ | $CH_3$ | 170-171 |
| $CH_3$ | $CH_3$ | ($R_1$ and $R_2$ together) cycloheptyl | | ($R_1$ and $R_2$ together) cycloheptyl | | $CH_3$ | $OCH_3$ | 161-16 |
| $CH_3$ | $CH_3$ | $C_2H_5$ | $-CH_2CH_2CH_2CH_3$ | $C_2H_5$ | $-CH_2CH_2CH_2CH_3$ | $CH_3$ | $CH_3$ | 164-166 |

EXAMPLE 12

The postemergence herbicidal activity of the compounds of the present invention is demonstrated by the following tests. In said tests, ten-day old crabgrass, yellow foxtail, wild oats, mustard, bindweed, and bush bean plants are sprayed with 35%/65% water/acetone solutions of test compound. Each flat is sprayed with 15 ml. of solution containing 50 mg. of compound. The sprayed plants are then placed on greenhouse benches and cared for in accordance with normal greenhouse procedures. Three weeks after treatment, all plants are examined and rated. The results obtained appear in Table IV below.

EXAMPLE 13

The postemergence herbicidal activity of the compounds of the present invention is demonstrated by the following tests. A variety of monocotyledonous and dicotyledonous plants, approximately two weeks old and growing in flats, are sprayed with 35%/65% aqueous acetone mixtures containing test compound in sufficient concentration to provide the equivalent of 0.5, 1.0, or 4.0 pounds of active compound per acre, when sprayed on the flats for a given period under 86 p.s.i.g. pressure.

After spraying, the flats are placed on greenhouse benches and cared for in accordance with normal green-

TABLE IV.—POSTEMERGENCE ACTIVITY

| Compound | Percent kill | | | | | |
|---|---|---|---|---|---|---|
| | Crabgrass | Foxtail | Wild oats | Mustard | Bindweed | Bush bean |
| [structure with $O-C(=O)-N(H)-C(CN)(CH_3)(CH_3)$ and $-NH-C(=O)-N(OCH_3)(CH_3)$] | 100 | 100 | 100 | 100 | 100 | 100 |
| [structure with $O-C(=O)-N(H)-C(CH_3)(CN)(CH_2CH_3)$ and $-N(H)-C(=O)-N(CN_3)_2$] | Stunted | 100 | 100 | 100 | 100 | 100 | house practices. Three weeks after treatment, the plants are examined and rated according to the index given below.

Plant Species

MG — Annual morning glory.
COT — Cotton.
SB — Sugar beet.
SOY — Soybean.
COR — Corn.
WO — Wild oats.
BA — Barnyardgrass.
FOX — Green foxtail.
MI — Foxtail millet.
RAG — Ragweed.
MU — Mustard.
LA — Lambs-quarters.

Rating Sytem:  Percent Difference in Growth from the Check [1]
0—no effect _____ 0
1—possible effect _____ 1–10
2—slight effect _____ 11–25
3—moderate effect _____ 26–40
4 _____ (2)
5—definite injury _____ 41–60
6—herbicidal effect _____ 61–75
7—good herbicidal effect _____ 76–90
8—approaching complete kill _____ 91–99
9—complete kill _____ 100

[1] Based on visual determination of stand, size, vigor, chlorosis, growth malformation, and over-all plant appearance.
[2] Abnormal growth, i.e., a definite physiological malformation but with an over-all effect less than a 5 on the rating scale.

TABLE V.—POSTEMERGENCE ACTIVITY

| Compound | Lbs./acre rate | MG | COT | SB | SOY | COR | WO | BA | FOX | MI | RAG | MU | LA |
|---|---|---|---|---|---|---|---|---|---|---|---|---|---|
| 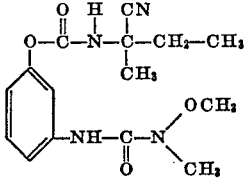 | 0.5<br>1.0<br>4.0 | 9<br>9<br>9 | 9<br>9<br>9 | 9<br>9<br>9 | 9<br>9<br>9 | 3<br>9<br>9 | 9<br>9<br>9 | 9<br>9<br>9 | 8<br>8<br>9 | 9<br>9<br>9 | 9<br>9<br>9 | 9<br>9<br>9 | 9<br>9<br>9 |
| 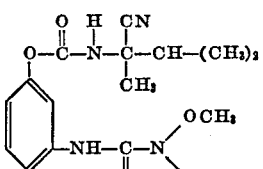 | 0.5<br>1.0<br>4.0 | 9<br>9<br>9 | 9<br>9<br>9 | 9<br>9<br>9 | 9<br>9<br>9 | 9<br>2<br>5 | 8<br>9<br>8 | 9<br>9<br>9 | 1<br>6<br>8 | 8<br>6<br>9 | 9<br>9<br>9 | 9<br>9<br>9 | 9<br>9<br>9 |
| 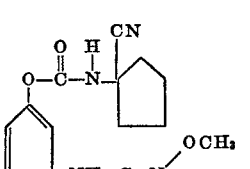 | 0.5<br>1.0<br>4.0 | 0<br>0<br>9 | 0<br>1<br>9 | 0<br>0<br>9 | 0<br>0<br>9 | 0<br>0<br>7 | 0<br>1<br>8 | 0<br>2<br>8 | 0<br>1<br>9 | 0<br>1<br>6 | 0<br>1<br>8 | 1<br>3<br>9 | 3<br>7<br>8 |
| 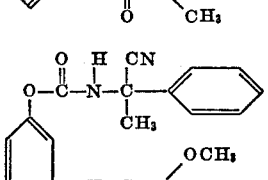 | 0.5<br>1.0<br>4.0 | 0<br>0<br>0 | 0<br>0<br>8 | 0<br>0<br>1 | 0<br>0<br>1 | 0<br>0<br>0 | 0<br>0<br>1 | 0<br>0<br>2 | 0<br>0<br>3 | 0<br>0<br>0 | 0<br>0<br>8 | 1<br>3<br>9 | |
| 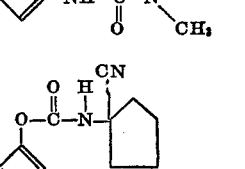 | 0.5<br>1.0<br>4.0 | 0<br>0<br>9 | 0<br>0<br>5 | 0<br>0<br>9 | 0<br>0<br>2 | 0<br>0<br>3 | 0<br>0<br>8 | 5<br>6<br>8 | 0<br>2<br>6 | 0<br>0<br>1 | 1<br>2<br>8 | 1<br>3<br>9 | 3<br>5<br>8 |
| 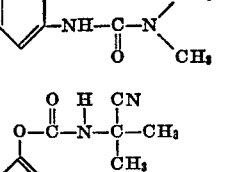 | 0.5<br>1.0<br>4.0 | 9<br>9<br>9 | 9<br>9<br>9 | 9<br>9<br>9 | 9<br>9<br>9 | 8<br>9<br>9 | 9<br>9<br>9 | 9<br>9<br>9 | 8<br>9<br>9 | 9<br>9<br>9 | 9<br>9<br>9 | 9<br>9<br>9 | 9<br>9<br>9 |

TABLE V—Continued

| Compound | Lbs./acre rate | MG | COT | SB | SOY | COR | WO | BA | FOX | MI | RAG | MU | LA |
|---|---|---|---|---|---|---|---|---|---|---|---|---|---|
| [Structure: phenyl with O-C(=O)-N(H)-C(CN)(cyclohexyl) and NH-C(=O)-N(CH₃)₂] | 0.5<br>1.0<br>4.0 | 9<br>9<br>9 | 9<br>9<br>9 | 9<br>9<br>9 | 9<br>9<br>9 | 9<br>9<br>3 | 8<br>8<br>9 | 8<br>9<br>9 | 5<br>6<br>9 | 8<br>8<br>9 | 9<br>9<br>9 | 9<br>9<br>9 | 9<br>9<br>9 |
| [Structure: O-C(=O)-NH-C(CN)(CH₃)(CH₂-CH₃); phenyl-NH-C(=O)-N(CH₃)₂] | 0.5<br>1.0<br>4.0 | 9<br>9<br>9 | 9<br>9<br>9 | 9<br>9<br>9 | 9<br>9<br>9 | 9<br>9<br>9 | 8<br>9<br>9 | 9<br>9<br>9 | 8<br>8<br>9 | 8<br>8<br>9 | 9<br>9<br>9 | 9<br>9<br>9 | 9<br>9<br>9 |
| [Structure: O-C(=O)-NH-C(CN)(CH₃)(phenyl); phenyl-NH-C(=O)-N(CH₃)₂] | 0.5<br>1.0<br>4.0 | 8<br>9<br>9 | 9<br>9<br>9 | 9<br>9<br>9 | 9<br>9<br>9 | 1<br>2<br>6 | 5<br>5<br>8 | 3<br>3<br>8 | 2<br>2<br>1 | 5<br>3<br>7 | 9<br>9<br>9 | 9<br>9<br>9 | 9<br>9<br>9 |
| [Structure: O-C(=O)-NH-C(CN)(CH₃)(CH(CH₃)₂); phenyl-NH-C(=O)-N(CH₃)₂] | 0.5<br>1.0<br>4.0 | 1<br>2<br>1 | 1<br>3<br>2 | 1<br>1<br>1 | 1<br>1<br>1 | 0<br>0<br>3 | 0<br>0<br>0 | 2<br>1<br>5 | 3<br>2<br>7 | 1<br>2<br>8 | 0<br>8<br>9 | 2<br>7<br>9 | 9<br>0 |
| [Structure: O-C(=O)-N-C(CN)(cyclohexyl); phenyl-NH-C(=O)-N(OCH₃)(CH₃)] | 0.5<br>1.0<br>4.0 | 0<br>1<br>1 | 0<br>1<br>3 | 0<br>3<br>6 | 0<br>1<br>7 | 0<br>0<br>2 | 0<br>0<br>1 | 0<br>0<br>5 | 0<br>0<br>7 | 0<br>0<br>1 | 0<br>0<br>7 | 1<br>3<br>9 | 5<br>6<br>7 |
| [Structure: O-C(=O)-NH-C(CN)(CH₂-CH₂-CH₂-CH₃)(CH₂-CH₃); phenyl-NH-C(=O)-N(CH₃)₂] | 0.5<br>1.0<br>4.0 | 0<br>0<br>0 | 0<br>0<br>0 | 0<br>0<br>0 | 0<br>0<br>0 | 0<br>0<br>0 | 0<br>0<br>0 | 0<br>0<br>0 | 0<br>0<br>0 | 0<br>0<br>0 | 0<br>0<br>0 | 0<br>6<br>9 | 0<br>1<br>2 |

EXAMPLE 14

The preemergence herbicidal activity of the compounds of the present invention is demonstrated by the following tests. In said tests, seeds or crabgrass, corn, watergrass, wild oats, bush beans, Indian mustard and curled dock are planted in flats. The seeded flats are then sprayed with an acetone/water mixture containing 1% of the surfactant Twene 20 and 50 mg. of test compound. This treatment provides the equivalent of 20 pounds per acre of test compound. After spraying, the flats are placed on greenhouse benches and cared for in accordance with conventional greenhouse procedures. Three weeks after spraying, the flats are examined and rated for herbicidal activity.

TABLE VI

| Compound | Percent kill | | | | | | |
|---|---|---|---|---|---|---|---|
| | Crab-grass | Water-grass | Mus-tard | Corn | Wild oats | Curled dock | Bush beans |
| 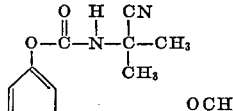 | 100 | 100 | 100 | 100 | 100 | 100 | 100 |
| 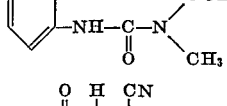 | 100 | 100 | (¹) | 100 | 100 | 100 | 100 |

¹ No test.

EXAMPLE 15

The preemergence herbicidal activity of the compounds of the invention is demonstrated in the following tests. Seeds of a variety of monocotyledonous and dicotyledonous plants are mixed with potting soil and planted in plastic pots on top of about one inch of potting soil. The seeded pots are then sprayed with a test solution (35%/65% acetone/water) containing test compound. The concentrations are such as to provide the equivalent of 0.5, 1.0 or 4.0 pounds per acre of acre of active compound when sprayed at 86 p.s.i.g.

After spraying, the pots are placed on greenhouse benches and cared for in routine fashion. Four weeks after treatment, the pots are examined and rated according to the index given above.

TABLE VII.—PREEMERGENCE HERBICIDAL ACTIVITY

| Compound | Lbs./acre rate | Ratings | | | | | | | | | | | |
|---|---|---|---|---|---|---|---|---|---|---|---|---|---|
| | | MG | COT | SB | SOY | COR | WO | BA | FOX | MI | RAG | MU | LA |
| 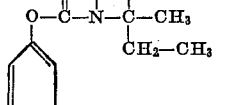 | 0.5<br>1.0<br>4.0 | 1<br>7<br>9 | 1<br>8<br>9 | 9<br>9<br>9 | 0<br>9<br>9 | 5<br>9<br>9 | 7<br>9<br>9 | 9<br>9<br>9 | 8<br>9<br>9 | 8<br>9<br>9 | 9<br>9<br>9 | 9<br>9<br>9 | 9<br>9<br>9 |
| 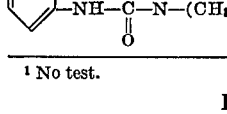 | 0.5<br>1.0<br>4.0 | 1<br>2<br>9 | 0<br>2<br>9 | 1<br>9<br>9 | 0<br>2<br>9 | 0<br>5<br>8 | 7<br>8<br>9 | 9<br>9<br>9 | 5<br>9<br>9 | 5<br>7<br>9 | 3<br>7<br>9 | 9<br>9<br>9 | 6<br>8<br>9 |
| 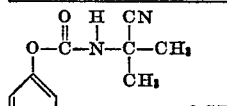 | 0.5<br>1.0<br>4.0 | 0<br>0<br>0 | 0<br>0<br>5 | 0<br>0<br>9 | 0<br>3<br>9 | 0<br>0<br>5 | 0<br>0<br>7 | 5<br>7<br>9 | 0<br>0<br>7 | 0<br>0<br>6 | 0<br>0<br>9 | 8<br>9<br>9 | 0<br>8<br>9 |
| 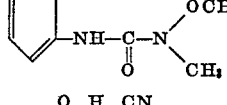 | 0.5<br>1.0<br>4.0 | 0<br>0<br>3 | 0<br>1<br>2 | 0<br>0<br>9 | 0<br>1<br>2 | 0<br>0<br>0 | 0<br>0<br>0 | 0<br>0<br>8 | 0<br>0<br>7 | 0<br>0<br>1 | 0<br>0<br>9 | 2<br>9<br>9 | 0<br>6<br>9 |
| 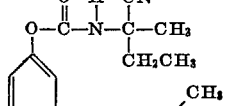 | 0.5<br>1.0<br>4.0 | 0<br>2<br>9 | 6<br>2<br>9 | 0<br>0<br>9 | 0<br>2<br>9 | 0<br>0<br>6 | 3<br>3<br>8 | 1<br>8<br>9 | 0<br>1<br>9 | 0<br>0<br>5 | 5<br>9<br>9 | 9<br>9<br>9 | 6<br>7<br>9 |

TABLE VI—Continued

| Compound | Lbs./acre rate | MG | COT | SB | SOY | COR | WO | BA | FOX | MI | RAG | MU | LA |
|---|---|---|---|---|---|---|---|---|---|---|---|---|---|
| (structure) | 0.5 | 0 | 0 | 8 | 1 | 0 | 7 | 9 | 9 | 5 | 8 | 9 | 8 |
|  | 1.0 | 9 | 3 | 9 | 9 | 8 | 7 | 9 | 9 | 8 | 9 | 9 | 9 |
|  | 4.0 | 9 | 9 | 9 | 5 | 9 | 9 | 9 | 9 | 9 | 9 | 9 | 9 |
| (structure) | 0.5 | 0 | 0 | 0 | 0 | 0 | 3 | 3 | 0 | 0 | 0 | 9 | 7 |
|  | 1.0 | 9 | 6 | 9 | 6 | 0 | 7 | 8 | 1 | 1 | 8 | 9 | 8 |
|  | 4.0 | 9 | 9 | 9 | 9 | 8 | 9 | 9 | 9 | 8 | 9 | 9 | 9 |
| (structure) | 0.5 | 0 | 0 | 0 | 0 | 0 | 0 | 0 | 0 | 0 | 0 | 1 | 3 |
|  | 1.0 | 0 | 1 | 0 | 0 | 0 | 1 | 2 | 1 | 1 | 1 | 3 | 7 |
|  | 4.0 | 9 | 9 | 9 | 9 | 7 | 8 | 8 | 9 | 6 | 8 | 9 | 8 |
| (structure) | 0.5 | 0 | 0 | 0 | 0 | 0 | 0 | 0 | 0 | 0 | 0 | 1 | 2 |
|  | 1.0 | 0 | 0 | 0 | 0 | 0 | 0 | 0 | 0 | 0 | 0 | 3 | 2 |
|  | 4.0 | 1 | 1 | 8 | 1 | 0 | 1 | 2 | 3 | 0 | 8 | 9 | 7 |
| (structure) | 0.5 | 0 | 0 | 0 | 0 | 0 | 0 | 5 | 0 | 0 | 1 | 1 | 3 |
|  | 1.0 | 0 | 0 | 0 | 0 | 0 | 0 | 6 | 2 | 0 | 2 | 3 | 5 |
|  | 4.0 | 9 | 5 | 9 | 2 | 3 | 8 | 8 | 6 | 1 | 8 | 9 | 8 |
| (structure) | 0.5 | 0 | 0 | 0 | 0 | 0 | 0 | 0 | 0 | 0 | 0 | 1 | 5 |
|  | 1.0 | 1 | 1 | 3 | 1 | 0 | 0 | 0 | 0 | 0 | 0 | 3 | 6 |
|  | 4.0 | 1 | 3 | 6 | 7 | 2 | 1 | 5 | 7 | 1 | 7 | 9 | 7 |
| (structure) | 0.5 | 0 | 0 | 0 | 0 | 0 | 0 | 0 | 0 | 0 | 0 | 0 | 0 |
|  | 1.0 | 0 | 0 | 0 | 0 | 0 | 0 | 0 | 0 | 0 | 0 | 6 | 1 |
|  | 4.0 | 0 | 0 | 0 | 0 | 0 | 0 | 0 | 0 | 0 | 0 | 9 | 2 |

We claim:

1. A compound having the formula:

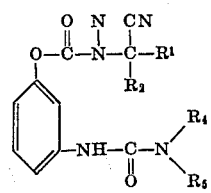

wherein $R_1$ represents a member selected from the group consisting of methyl and ethyl, or when taken together with $R_2$ forms a cycloalkyl $C_3$–$C_6$; $R_2$ represents a member selected from the group consisting of alkyl $C_1$–$C_8$, cycloalkyl $C_3$–$C_6$, or

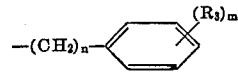

where $R_3$ is halogen, or loweralkyl $C_1$–$C_4$; $n$ is an integer selected from 0, 1, and 2; $m$ is an integer selected from 0, 1, 2, and 3; $R_4$ represents an alkyl radical $C_1$-$C_5$; and $R_5$ represents a member selected from the group consisting of alkyl $C_1$-$C_5$ and alkoxy $C_1$-$C_5$.

2. A compound according to Claim 1, m-(3-methoxy-3-methylureido)phenyl (1-cyano - 1 - methylethyl)carbamate.

3. A compound according to Claim 1, m-(3,3-dimethylureido)phenyl (1-cyanocyclohexyl)carbamate.

4. A compound according to Claim 1, m-(3,3-dimethylureido)phenyl (1-cyano-1-methylpropyl)carbamate.

5. A compound according to Claim 1, m-(3,3-dimethylureido)phenyl ($\alpha$-cyano-$\alpha$-methylbenzyl)carbamate.

6. A compound according to Claim 1, m-(3-methoxy-3-methylureido)phenyl (1-cyano - 1 - methylpropyl)carbamate.

7. A compound according to Claim 1, m-(3-methoxy-3-methylureido)phenyl (1-cyano - 1,2 - dimethylpropyl)carbamate.

References Cited

UNITED STATES PATENTS

| | | | |
|---|---|---|---|
| 3,317,583 | 5/1967 | Hsi | 260—465 D |
| 3,488,376 | 1/1970 | Ulrich | 260—465 D X |
| 3,625,992 | 12/1971 | Duerr et al. | 260—465 D X |
| 3,577,453 | 5/1971 | Rohr et al. | 240—465 D |
| 3,304,225 | 2/1967 | Szabo et al. | 260—465 D X |
| 3,551,477 | 12/1970 | Koenig et al. | 260—465 D X |

JOSEPH P. BRUST, Primary Examiner

U.S. Cl. X.R.

71—105; 260—464, 465.4, 465.5 R